US008223131B2

(12) United States Patent
Rudolph et al.

(10) Patent No.: US 8,223,131 B2

(45) Date of Patent: *Jul. 17, 2012

(54) DISAPPEARING INTERFACE SYSTEM

(75) Inventors: John R. Rudolph, Antioch, TN (US); Gary Fisher, Goodlettsville, TN (US); Frank Downing, Martinez, GA (US); Robert McCoy, Franklin, TN (US); Maureen Donoho, Goodlettsville, TN (US); James Hughes, Hendersonville, TN (US)

(73) Assignee: Electrolux Home Products, Inc., Charlotte, NC (US)

( * ) Notice: Subject to any disclaimer, the term of this patent is extended or adjusted under 35 U.S.C. 154(b) by 715 days.

This patent is subject to a terminal disclaimer.

(21) Appl. No.: 12/390,921

(22) Filed: Feb. 23, 2009

(65) Prior Publication Data

US 2009/0179864 A1 Jul. 16, 2009

Related U.S. Application Data

(63) Continuation of application No. 10/872,670, filed on Jun. 21, 2004, now Pat. No. 7,499,003.

(60) Provisional application No. 60/558,270, filed on Mar. 31, 2004.

(51) Int. Cl.

| | |
|---|---|
| ***G06F 3/041*** | (2006.01) |
| ***G09G 3/14*** | (2006.01) |
| ***H05B 1/02*** | (2006.01) |

(52) U.S. Cl. .......................... 345/173; 345/39; 219/506

(58) Field of Classification Search .................... 345/39, 345/56, 168, 173; 219/506

See application file for complete search history.

(56) References Cited

U.S. PATENT DOCUMENTS

| | | | | |
|---|---|---|---|---|
| 3,787,666 | A | 1/1974 | Schumann et al. | |
| 4,204,204 | A | 5/1980 | Pitstick | |
| 4,372,054 | A | 2/1983 | Pomerantz et al. | |
| 5,293,152 | A | 3/1994 | Bussin et al. | |
| 5,493,183 | A | 2/1996 | Kimball | |
| 5,900,175 | A | 5/1999 | Kicherer et al. | |
| 6,166,496 | A | 12/2000 | Lys et al. | |
| 6,198,080 | B1 | 3/2001 | Rice et al. | |
| 6,255,960 | B1 * | 7/2001 | Ahne et al. | 345/168 |
| 6,614,419 | B1 | 9/2003 | May | |
| 6,724,376 | B2 | 4/2004 | Sakura et al. | |
| 6,873,262 | B2 | 3/2005 | Midlang | |
| 2002/0135307 | A1 * | 9/2002 | Cousy | 315/76 |

FOREIGN PATENT DOCUMENTS

| | | |
|---|---|---|
| JP | 5-288352 | 11/1993 |
| JP | 8-210651 | 8/1996 |

* cited by examiner

*Primary Examiner* — Kevin M Nguyen

(74) *Attorney, Agent, or Firm* — Pearne & Gordon LLP

(57) ABSTRACT

A disappearing interface system for a device, such as an appliance (e.g., a cooking range) having an interactive user interface, a light-emitting device (e.g., a LED), a microprocessor based LED fader electronic control system that uses a PWM signal to drive an A/D circuit to control the intensity (e.g., fade in/out) of the light-emitting device.

24 Claims, 7 Drawing Sheets

DISAPPEARING INTERFACE SYSTEM

CROSS-REFERENCE TO RELATED APPLICATIONS

This application is a continuation of U.S. application Ser. No. 10/872,670, filed on Jun. 21, 2004 which claims the benefit of provisional application Ser. No. 60/558,270, filed on Mar. 31, 2004. These applications are incorporated in their entirety herein by reference.

FIELD OF INVENTION

The present invention relates to appliances and more particularly to an interactive informational interface display on ranges, stoves and other appliances.

BACKGROUND OF THE INVENTION

The use of electronic displays on appliances and more specifically on ranges has become fairly commonplace. Furthermore, the use of an interactive interface (e.g., a touch screen) on appliances such as a range has also become commonplace. However, the presence of graphics such as text and buttons displayed on these electronic displays can add a cluttered appearance to the appliance. Therefore, it is desirable to have an electronic information display that turns off or disappears entirely or at least partially after a period of inactivity.

U.S. Pat. No. 5,239,152, incorporated herein by reference, discloses one example of a touch sensor panel with hidden graphic mode.

BRIEF SUMMARY OF THE INVENTION

In accordance with one aspect, the present invention provides an appliance that has an informational display that disappears, at least partially, when not in use.

In accordance with another aspect, the present invention provides an apparatus that has a touch screen interface that disappears, at least partially, when not in use.

In accordance with another aspect, the present invention provides a range that has a display that disappears when not in use.

In accordance with yet another aspect, the present invention provides an interface display that becomes visible, at least in part, responsive to an input from a user.

In accordance with yet another aspect, the present invention provides a disappearing interface system having an interface means and a control means connected to the interface means having at least one light-emitting diode located behind the interface means and where the control means receives a signal from the interface means and further processes the signal to reduce or increase the light intensity of the at least one light-emitting diode.

In accordance with one aspect, the present invention provides a disappearing interface system that includes interface means for information exchange between a user and the interface system. The interface means includes at least one light-emitting diode visible to the user when activated. The system includes control means, operatively connected to the interface means, for changing intensity of the light emitted from the light-emitting diode in response to a condition at the interface means.

In accordance with another aspect, the present invention provides a cooking range that includes: a user interface having a plurality of touch pad buttons further comprising an informational display area; a microprocessor-based fader electronic control system further comprising: a digitized exponential curve; a time-stepping algorithm to read data from the exponential curve; a pulse width modulated output signal generated by the microprocessor and controlled by the time-stepped algorithm; a digital to analog circuit driven by the pulse-width modulated output signal; an LED array located behind the user interface and driven by the digital to analog circuit; and, wherein the LED fader electronic control system receives an input from the user interface and further processes the information to reduce or increase at least a portion of the light intensity of the LED array.

In accordance with another aspect, the present invention provides disappearing interface system. The system includes interface means for information exchange between a user and the interface system, the interface means including at least one light-emitting device visible to the user when activated. The system includes control means, operatively connected to the interface means, for changing intensity of the light emitted from the light-emitting diode, and including a variable frequency digital signal provider and a digital to analog voltage provider, the analog voltage being provided to energize the light-emitting device.

In accordance with another aspect, the present invention provides a method of controlling light intensity within an interface system, such that the interface may disappear from view, the interface system including interface means for information exchange between a user and the interface system, the interface means including at least one light-emitting diode visible to the user when activated and the interface system including control means, operatively connected to the interface means, for changing intensity of the light emitted from the light-emitting diode. The method includes providing a condition indication regarding the interface means for use in the control means, and processing the condition indication to provide a changing voltage to the light-emitting diode to change the intensity of the light emitted from the light-emitting diode in response to the condition.

In accordance with another aspect, the present invention provides a method of activating and deactivating the light intensity of a disappearing interface system on a cooking range display. The method includes providing a user interface having a plurality of touch pad buttons and an informational display area, an electronic control system comprising a digitized exponential curve, a microprocessor based time-stepped algorithm to process data from the digitized exponential curve, a pulse width modulated output digital signal generated by the microprocessor based on the data received from the time-stepped algorithm, a digital to analog circuit to receive the pulse width modulated output signal, and an at least one light-emitting diode; inputting a signal to the user interface; reading the digitized data from the digitized exponential curve; transmitting the data to the output of the microprocessor; modifying the frequency of the pulse-width modulated signal; transmitting the pulse-width modulated signal to the digital to analog circuit; applying a voltage to the output of the digital to analog circuit; and, adjusting the light intensity of the at least one light-emitting diode.

It is to be appreciated that other, different, possibly more broad aspects are provided as other aspects of the present invention.

BRIEF DESCRIPTION OF THE DRAWINGS

The invention may take physical form in certain parts and arrangement of parts, an example of which will be described in detail in this specification and illustrated in the accompanying drawings that form a part of the specification.

DESCRIPTION OF AN EXAMPLE EMBODIMENT

Figure 1:
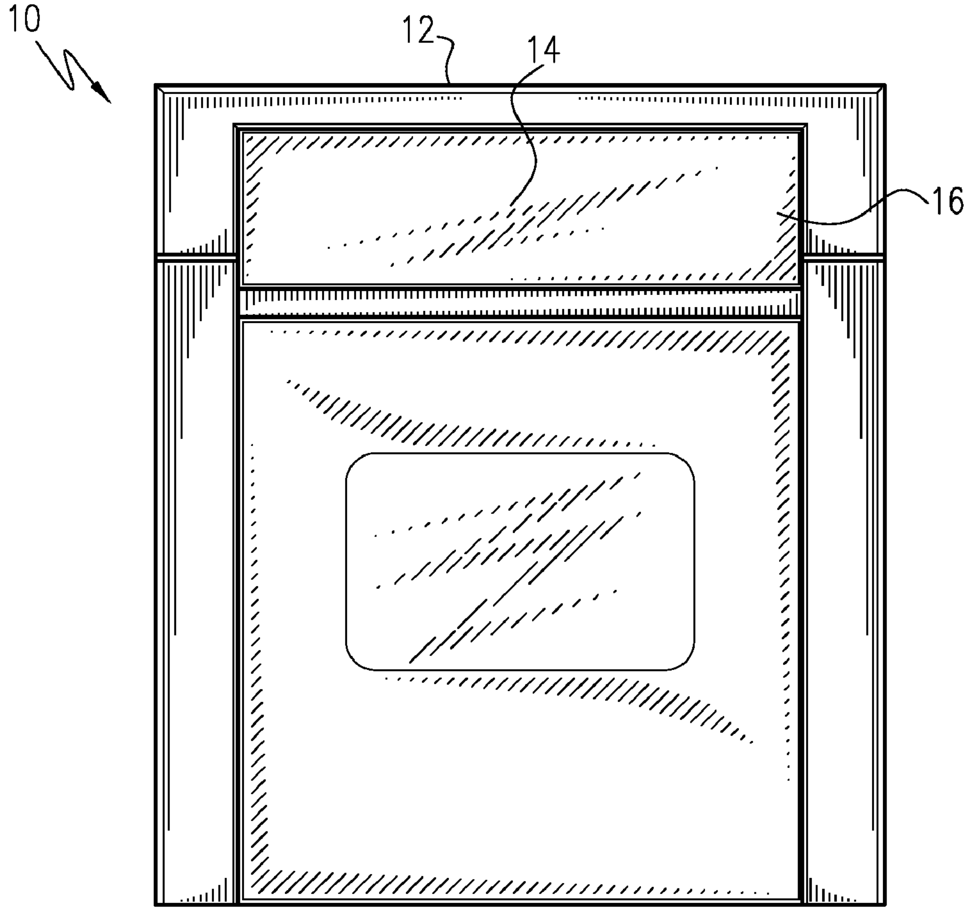
FIG. 1 is a front view of a typical range that incorporates an example disappearing user interface system in accordance with this invention, with the user interface in one operational mode.

Referring now to the drawings, which are for purposes of illustrating an example of the invention only and not for purposes of limiting the same, FIG. 1 shows a front view of a typical range 10 that incorporates a disappearing interface system in accordance with this invention. It is to be appreciated that the present invention may be utilized on any other sort of device. For example, the invention may be utilized on other types of appliances, such as large or small appliances. Examples of large appliances include washers, dryers, refrigerators, and freezers. Example of small appliances includes, toasters, coffee makers, and microwave ovens. However, it is to be appreciated that the present invention may not be limited to use with an appliance or a particular type of appliance.

Figure 2:
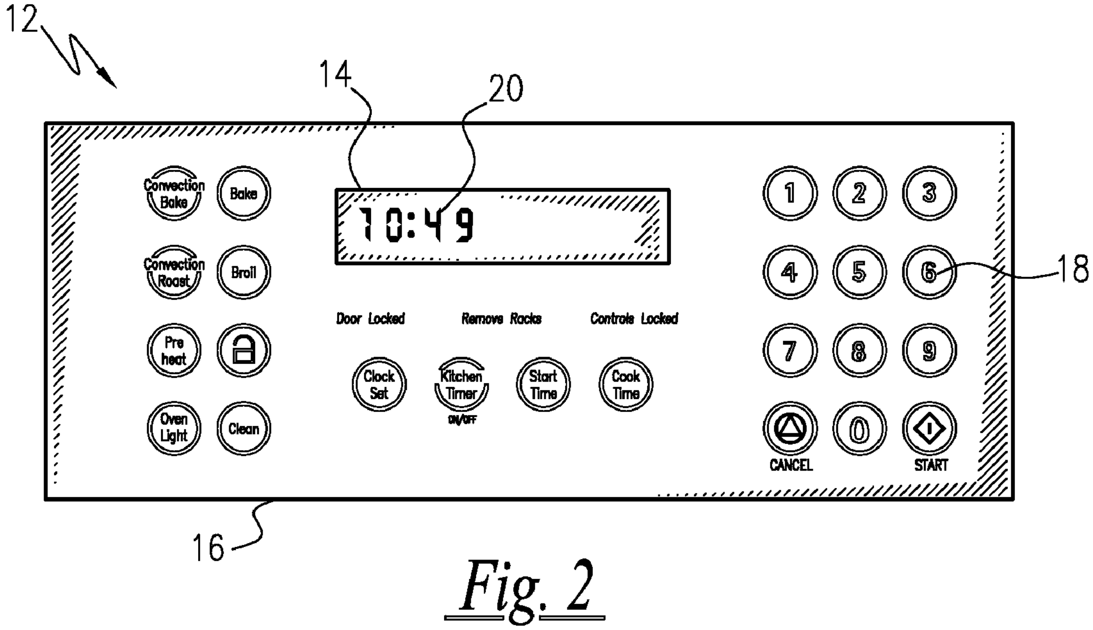
FIG. 2 is an enlarged front view of a portion of the range of FIG. 1 and shows the user interface in another operational mode.
Figure 3:
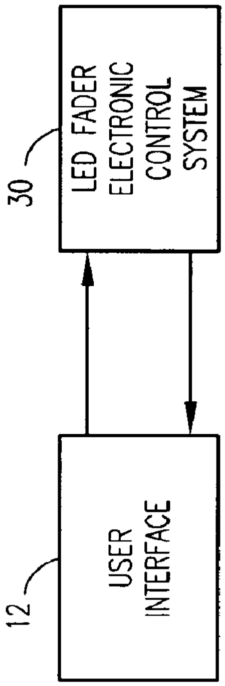
FIG. 3 is a top level communication diagram indicating communication from the user interface of FIG. 2 to a LED fader electronic control system.
Figure 4:
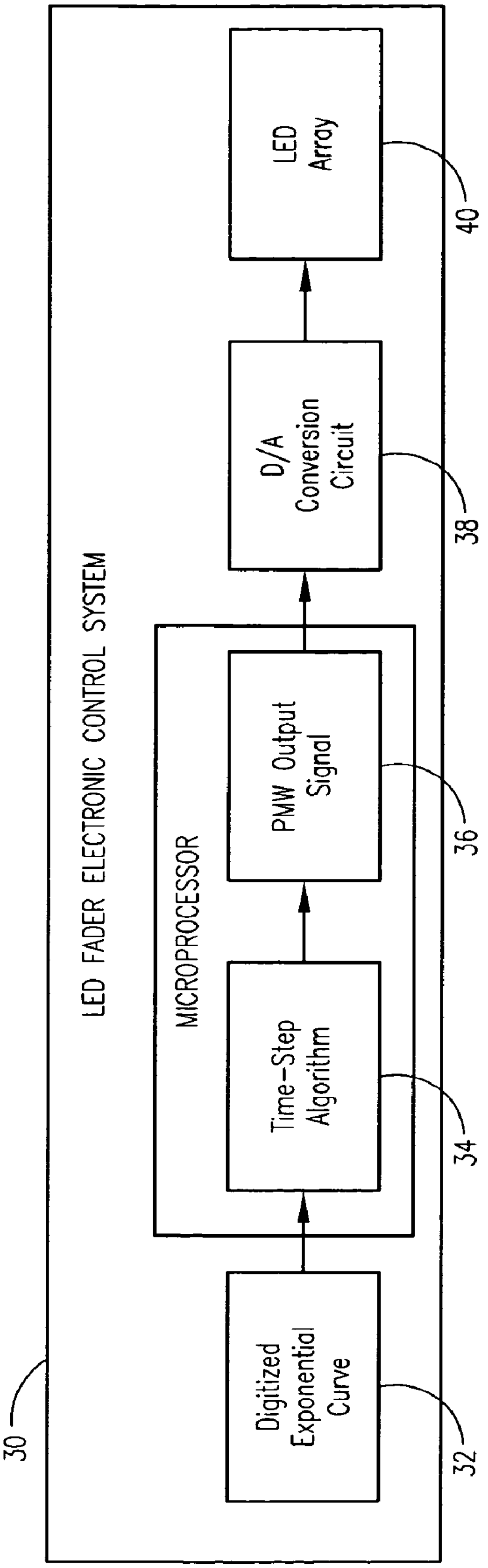
FIG. 4 is an example functional block diagram of the LED fader electronic control system.

An example of a user interface 12 of the disappearing interface system is shown in FIG. 2. FIG. 3 is a top level diagram showing communication between the user interface 12 and a light emitting diode (LED) fader electronic control system 30. As such, in the shown example, the disappearing interface system consists of a user interface 12 and the LED fader electronic control system 30.

Referring to FIGS. 1 and 2, the example user interface 12 further includes an informational display area 14 and black tinted glass 16. The example informational display area 14 displays touch sensitive areas 18 used for providing user input to operate the range 10. As such, the user interface 12 communicates with the electronic control system of the range 10 to perform basic operations (e.g. cooking, baking, roasting, etc.) commonly known in the art and will not be further described herein. The example informational display area 14 also displays information providing areas, such as a clock 20, and other information such as oven temperature, minutes remaining until cooking is complete, etc. It is to be appreciated that the touch sensitive areas 18 may have various constructions, configurations, and operation techniques. For simplicity, the touch sensitive areas are simply referred to as "buttons." However, it is to be appreciated that touch alone may be sufficient to effect operation and that physical movement of the buttons may not occur. The black tinted glass 16 is used to hide the components of the disappearing interface system when the disappearing interface system is inactive as will be described further below. In other words, the black tinted glass 16 will appear to be a plain black glass when the disappearing interface system is inactive as shown in FIG. 1. Thus, a clear, uncluttered appearance is provided.

Referring to FIGS. 4-8, the example LED fader electronic control system 30 is a microprocessor-based control system. In the shown example, an output from a digitized exponential curve 32 is provided to a microprocessor that performs the functions of a time-stepping algorithm 34, and providing a pulse width modulated (PWM) output signal 36. In turn, the PWM signal is provided to a digital to analog conversion circuit (D/A circuit) 38, whose output is provided to an LED array 40. In operation, the microprocessor performs the time-stepping software routine that utilizes the digitized data from the digitized exponential curve 32 to generate the PWM output signal 36. It is to be appreciated that the function digitized exponential curve 36 may be provided by any suitable components(s), operations(s), etc. such as a provision of information from a memory or an algorithm being performed. The D/A circuit 38 in turn drives the light intensities of the LED light array 40. The intensity of the LED light array 40 is a function of the PWM signal 36 frequency generated by the microprocessor. Each component of the LED fader electronic control system 30 will now be described in more detail.

Figure 5:
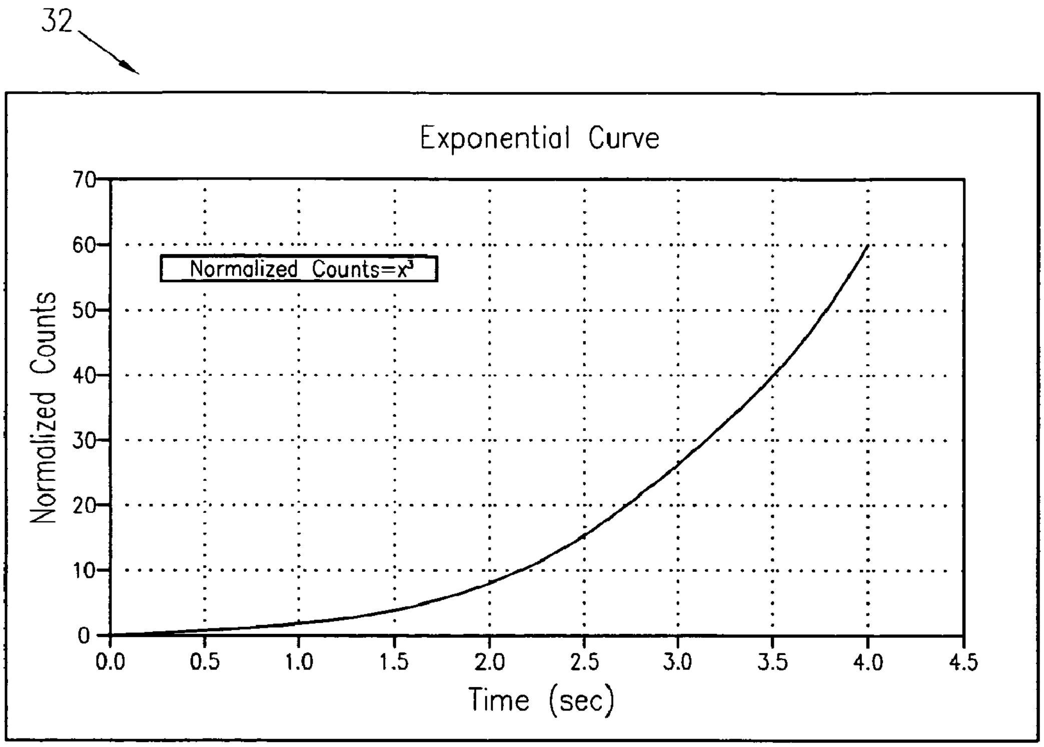
FIG. 5 is an example graph of a digitized exponential curve used within the LED fader electronic control system of FIG. 4.

The human eye detects magnitude of light in a nonlinear manner. As such, in one example, a nonlinear fading effect is utilized to give the appearance that the LED light array 40 has a changing (e.g., increase or decrease) intensity in a smooth linear fashion. The digitized exponential curve 32, such as the one shown in FIG. 5, provides this effect. It should be noted that the exponential curve of FIG. 5 is for purposes of illustration only and is not intended to limit the scope of the invention. Any type of table, equation, graph etc. depicting a rate of increase or decrease such as a linear rate, exponential rate, logarithmic rate, etc. can be used in the present invention. Furthermore, any time interval or exponential rate can be used in the present invention. As the time increases from 0 seconds to 4 seconds the corresponding normalized count value increases at an exponential rate of $x^3$. The digitized exponential curve 32, itself, is an indication of the increase or decrease in light intensity of the LED array 40.

The time-stepping algorithm 34 reads the data from the digitized exponential curve 32 (e.g., FIG. 5) and provides information for use in providing the PWM signal 36 output by the microprocessor. The time-stepping algorithm does this by incrementally stepping through the time data points on the digitized exponential curve 32 as time increases from 0 seconds to 4 seconds. The time-stepping algorithm 34 then reads the corresponding normalized count value and provides this value to the PWM signal 36. The value of the normalized count determines the frequency of the PWM signal 36, which in turn determines the intensity of the LED array 40 as will be described in further detail below.

Figure 6:
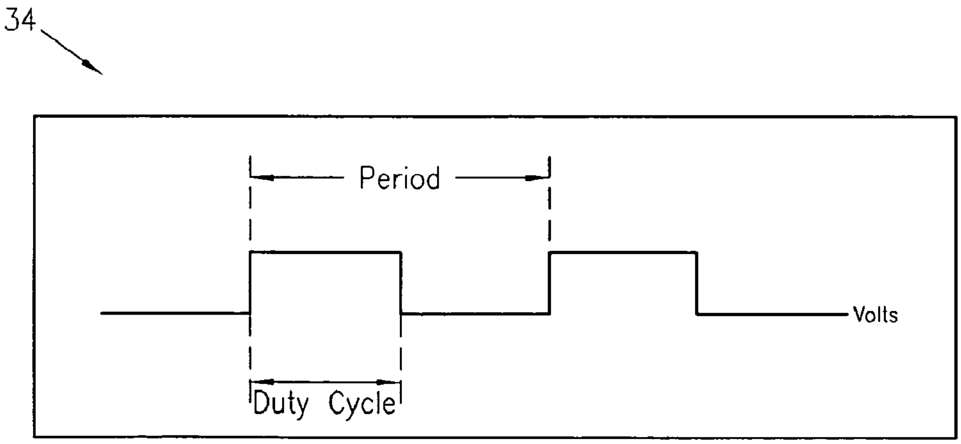
FIG. 6 is an example a pulse width modulated output signal provided within the LED fader electronic control system.

Referring to FIG. 6, as previously mentioned, the PWM output signal 36 is generated by the microprocessor and drives the D/A circuit 38 which in turn drives the LED array 40. The frequency of the PWM signal 36 is a function of the normalized count value from the digitized exponential curve 32. As the normalized count increases the frequency of the PWM signal 36 increases and as the normalized count decreases the frequency of the PWM signal 36 decreases. The PWM signal 36 shown in FIG. 6 has a duty cycle of 50%. This means that an energizing voltage is provided 50% of the time. The period indicates the cycling. As will be appreciated further below, the ON-OFF cycling, and specifically the frequency/period of the cycling, is employed to achieve a fading effect within the LED array 40.

Figure 7:
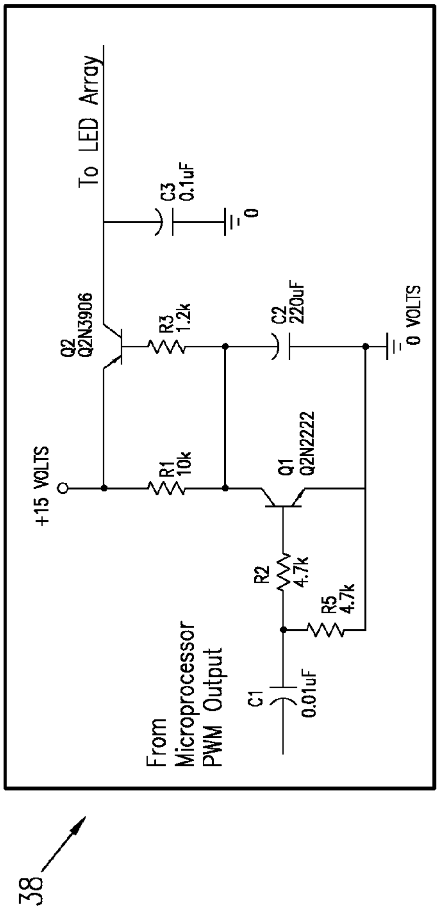
FIG. 7 is a schematic of an example digital to analog conversion circuit within the LED fader electronic control system.

Referring to FIG. 7, the D/A circuit 38 receives the PWM signal 36 from the microprocessor. It is to be appreciated that FIG. 7 shows one example of the D/A circuit 38 that is useful within the present invention and is not intended to limit the scope of the invention. Further, FIG. 7 shows specific circuitry values. It should be appreciated that the overall shown example is not a limitation on the present invention, and specific circuitry values are not a limitation on the present invention. It is contemplated that many other circuit configurations, D/A circuits, circuit values, etc. can be employed within the scope of the present invention.

Within the D/A circuit 38, the PWM signal 36 is first applied to a capacitor C1, which operates as coupling device. It provides for a percentage of ON input. Specifically, when the input provided to the capacitor is a pulsing signal a varying voltage will occur at the downstream side (i.e., right side as viewed in FIG. 7) of the capacitor C1. When a pulsing signal ceases to be applied to the capacitor C1, the voltage at the downstream side is quickly drawn down to zero volts (e.g., ground) through a resistor R5.

During receipt of the pulsing input, a voltage is applied to a first transistor Q1 (i.e., at a base of the transmitter, left pin of the transmitter as viewed in FIG. 7). Such voltage from capacitor C1 via resistor R5 can selectively (i.e., ON-OFF toggling) cause activation of the transistor Q1. As can be appreciated, with selective activation of the transistor Q1, the voltage at the collector of the transistor Q1 (i.e., the top pin of the transistor as shown in FIG. 7) is a chopped voltage, which is a changing fraction of the voltage source (e.g., 15 volts) provided through a resistor R1. In order to provide a smoothing effect to the otherwise chopped voltage, a capacitor C2 is connected between the collector of the transistor Q1 and ground. Another point to note is that, because the voltage applied to the capacitor C1 is a square wave, the output voltage from the transistor Q1 would otherwise "flicker" at the rate equal to the frequency of the PWM signal 36. This flickering should not be permitted to translate into flickering at the LED array 40. As such, the capacitor C2 is added to average the voltage caused by Q1 and create an analog voltage that is proportional to the frequency of the PWM signal 36.

A transistor Q2 has a base (i.e., bottom pin as viewed in FIG. 7) connected to the collector of the transistor Q1 and the capacitor C2, thus receiving the smoothed voltage, via a resistor R3. As such, the analog voltage (i.e., from transistor Q1 and capacitor C2) controls the transistor Q2. The transistor Q2 is also connected (i.e., at the emitter, left pin as viewed in FIG. 7) to the voltage source. An output signal from the transistor Q2 is provided at the collector (right pin as viewed in FIG. 7). It should be noted that the transistor Q2 is not operated as merely an ON-OFF toggle switch, which would merely provide effectively all (e.g., 14.3 volts) or none of the supply voltage. Instead, the transistor Q2 is operated in its transition range for a time-significant duration such that the voltage output (i.e., voltage output at the right pin as shown in FIG. 7) of the transistor varies as a function of the changing pulse signal input to the D/A circuit 38 (i.e., at the capacitor C1). As such, the transistor is significantly operated in the range that is less than a full ON state. The last capacitor C3 is connected to the output (i.e., right pin) of the transistor Q2 and provided a noise reduction function on the output signal. Therefore, the voltage applied to the LED array 40 can be controlled by varying the frequency of the PWM signal 36. This feature can be referred to as fading in the LED array 40.

It is to be appreciated that the voltage applied to the LED array 40 can also be controlled to fade out the LED array 40. For such a function the operation of the D/A conversion circuit 38 is very similar to that described above. However, a reduction of normalized counts is employed instead of an increase of counts. For example, the curve shown in FIG. 5 can be used in a reverse progression or even a corresponding reversal curve could be used.

Figure 8:
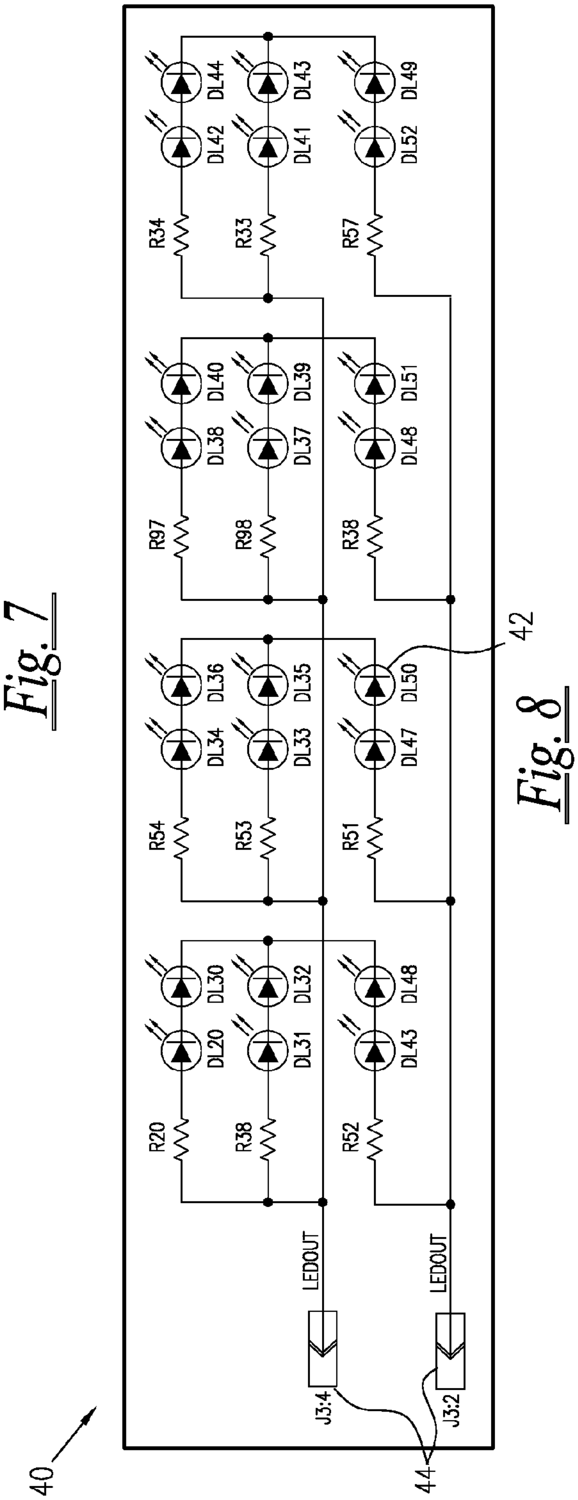
FIG. 8 is a schematic of an example LED array portion within the disappearing user interface system shown in FIGS. 1 and 2.

Referring to FIG. 8, the LED array 40 as shown is for purposes of illustration only and is not intended to limit the scope of the invention. The LED fader electronic control system 30 can be applied to a single LED 42 or a group of LED's 46 as in the present invention. In addition, the LED array as shown utilizes two drive line connections 44 to drive the entire array in order to reduce the number of overall connections. It should be noted that any number of drive connections may be used as commonly known in the art.

Figure 8A:
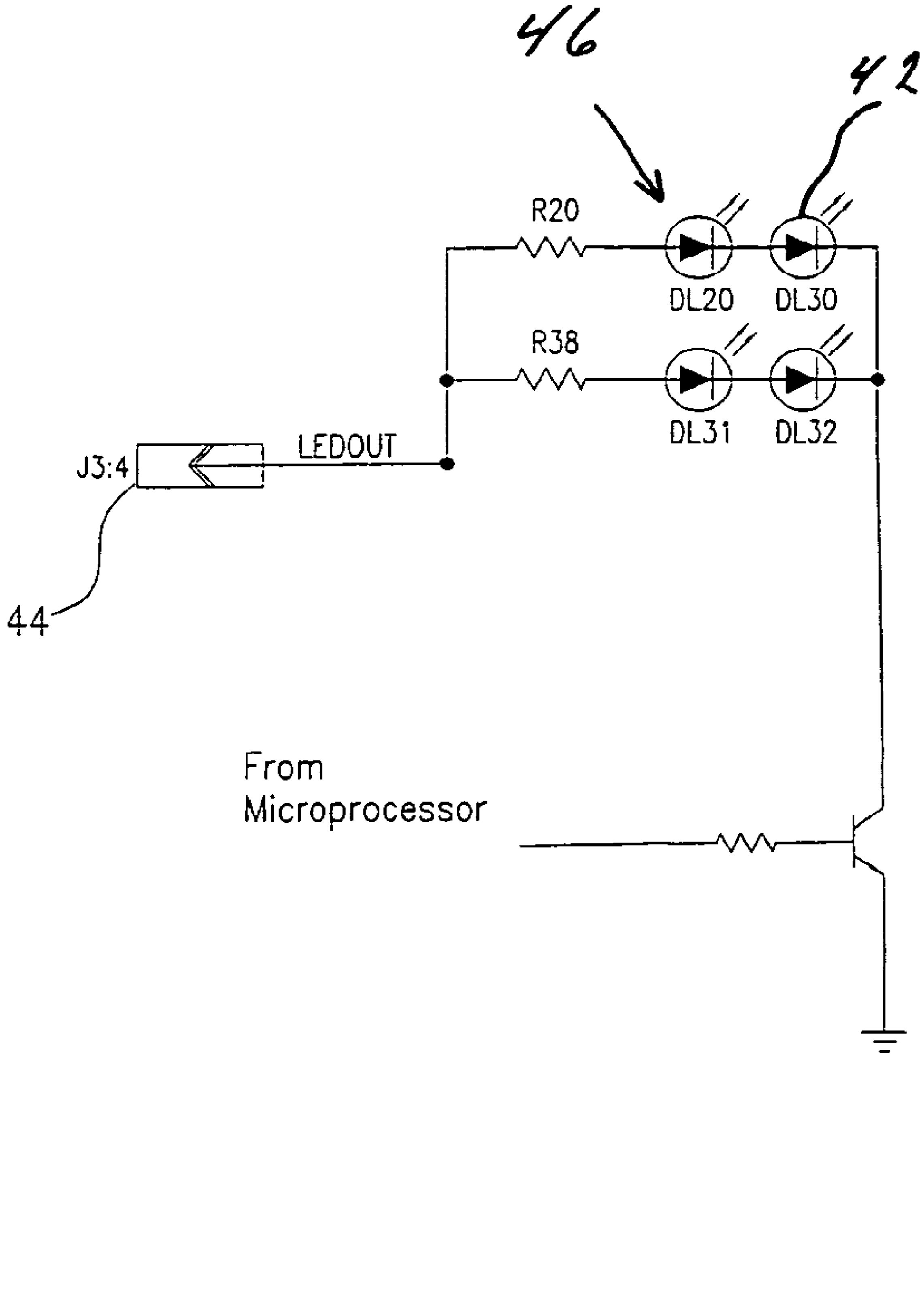
FIG. 8A is a schematic of an example LED array group within the LED array portion shown in FIG. 8.

It is to be appreciated that each LED 42 or group of related LEDs 46 can be ON/OFF controlled via a switching arrangement (e.g., a transistor) controlled by a microprocessor such as the example shown in FIG. 8A. As such, the varying voltage, which is provided by the D/A circuit 38 is permitted to cause activation (i.e., an ON state) of a specific LED 42 or group of LEDs 46 based upon control by the microprocessor and the associated switching arrangement. Of course, because the ON state for a specific LED or group of LEDs 46 is based upon a varying voltage (i.e., either increasing or decreasing), the light intensity of a specific LED 42 or group of LEDs 46 varies accordingly. It is appreciated that the ON/OFF switching arrangement shown in FIG. 8A is for purposes of illustration and is not intended to limit the scope of the present invention. Any type of switching arrangement commonly known in the art such as a path to ground circuit can be used in the present invention.

Operation of the example LED fader electronic control system 30 will now be described. FIG. 1 shows the informational display 14 in the sleep mode. In this mode the LED array 40 is off and the informational display 14 is blank or in other words has disappeared. When the user touches a touch-sensitive portion (e.g., a button) of the user interface 12 the time-stepped algorithm 34 steps through the data provided by the digitized exponential curve 32. As the time-stepped algorithm 34 reads the data it sends a corresponding normalized count value to the output of the PWM signal 36. The value of the normalized count determines the frequency of the PWM signal 36. The higher the normalized count the higher the frequency of the PWM signal 36 and the lower the normalized count the lower the frequency. The PWM signal 36 in turn drives the D/A circuit 38 as described above. As previously mentioned, the voltage applied to the LED array 40 is controlled by varying the frequency of the PWM signal 36. As the frequency of the PWM signal 36 increases the applied voltage to the LED array 40 increases and subsequently the light intensity of the LED array 40 also increases. Therefore, as time progresses from the time the user activates the disappearing interface system the normalized count value increases which increases the frequency of the PWM signal 36 which increases the voltage applied to the D/A circuit 38 which increases the light intensity of the LED array 40. Furthermore, when the user activates the disappearing interface system, the informational display will increase in intensity until the LED array 40 is at full intensity. FIG. 2 shows the informational display 14 after the user has activated the disappearing interface system.

Conversely, as the frequency of the PWM signal 36 decreases the applied voltage to the LED array 40 decreases and subsequently the light intensity of the LED array 40 also decreases. Then the intensity of the LED array 40 will decrease to a value corresponding to the value of the PWM signal 36 duty cycle as described above.

Along the lines of how a decreased intensity state (e.g., sleep mode) is achieved, it is to be noted that any suitable approach may be used. For example, after a predetermined period of inactivity the time-stepped algorithm 34 reads the data from the digitized curve 32 in a manner opposite of that described above. Therefore, as the time of inactivity increases, the normalized count value will decrease thus decreasing the frequency of the PWM signal 36 which decreases the applied voltage to the D/A circuit 38 which ultimately decreases the light intensity of the LED array 40 (i.e., fade out). Also, it is possible that the progression (i.e., fade out) is initiated via a touch (e.g., an enter sleep mode button).

Referring to FIGS. 1 and 9-12 the disappearing interface system contains several modes of operation. The modes include a sleep mode, an informational sleep Mode, an active mode, active sleep mode, and an active mode with context sensitive touch pad buttons active.

FIG. 1 shows the disappearing interface system in the sleep mode. In this mode the entire informational display area 14 is blank or in other words has disappeared (i.e., faded out).

Figure 9:
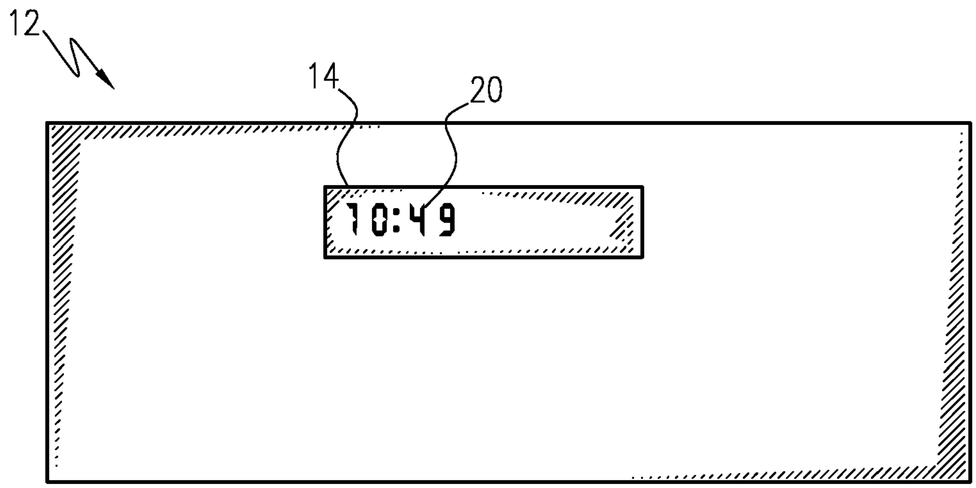
FIG. 9 is an enlarged front view of the user interface of the range of FIG. 1, with the interface in another operational mode that can be termed an informational sleep mode.

FIG. 9 shows the disappearing interface system in the informational sleep mode. In this mode the informational display area 14 displays limited information and the remaining display area 14 remains blank. In the example shown in FIG. 9 the information displayed is the clock 20.

Figure 10:
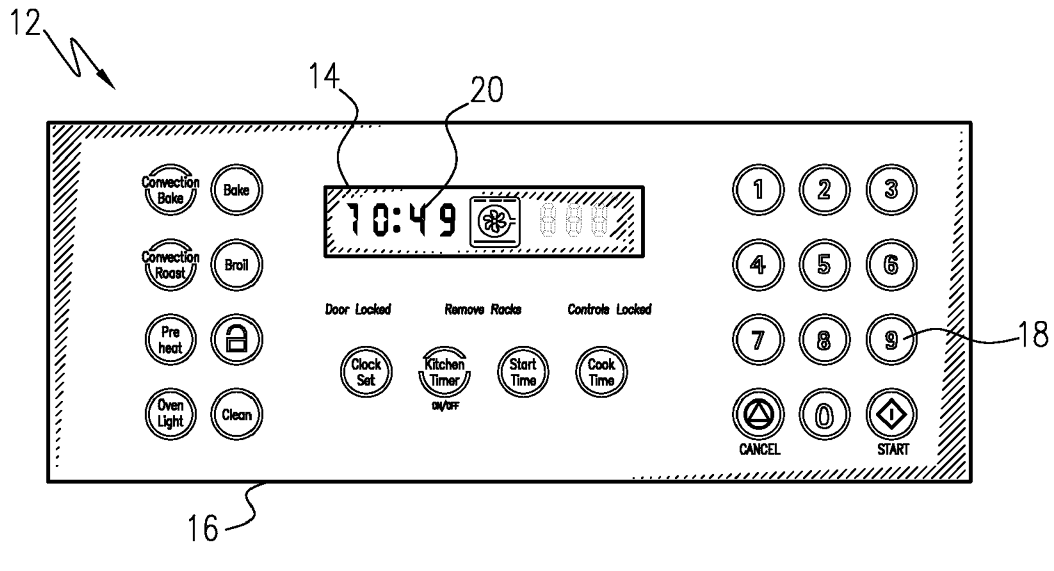
FIG. 10 is a view similar to FIG. 9, but shows the interface in another operational mode that can be termed an active mode.

FIG. 10 shows the disappearing interface system in the active mode. In this mode all the information on the informational display area 14 is visible.

Figure 11:
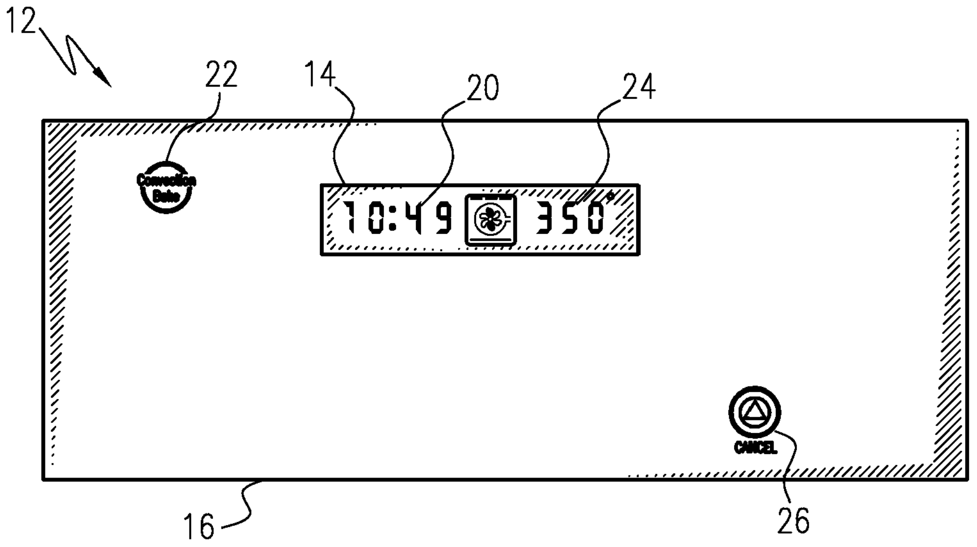
FIG. 11 is a view similar to FIG. 9, but shows the interface in another operational mode that can be termed an active/sleep mode.

FIG. 11 shows the disappearing interface system in the active/sleep mode. In this mode the range 10 is operating however a large portion of the informational display area 14 is blank or has disappeared. The only information displayed on the informational display area 14 are those range functions that are currently in use. For example, in FIG. 11 the informational display area 14, in addition to the clock 20, also shows the convection bake touch pad button 22, the oven temperature 24, and the cancel touch pad button 26 illuminated. This means that the range is currently operating in a convection bake mode at a temperature of 170 degrees. The remaining portion of the informational display area 14 has disappeared because there has been no input activity from the user.

Figure 12:
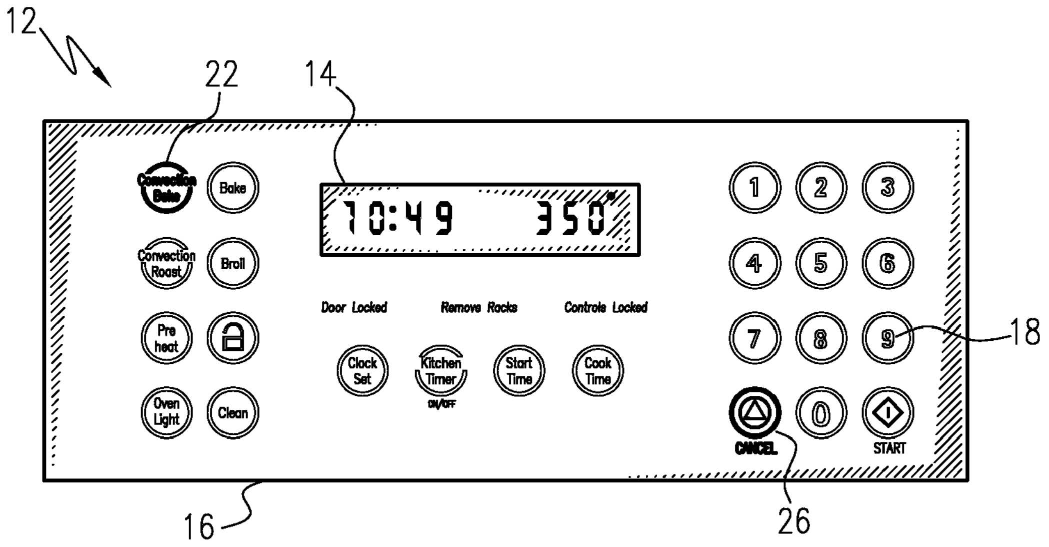
FIG. 12 is a view similar to FIG. 9, but shows the interface in the active mode with context sensitive touch pad buttons activated.

FIG. 12 shows the disappearing interface system in the active mode with context sensitive touch pad buttons active. In this mode, depending on the state of the range 10, the context sensitive touch pad buttons have the ability to change color or illuminate with a greater intensity than the rest of the display area 14. For example, the cancel touch pad button 26 will change from the color blue when the cancel button is not available to red when the cancel button is available.

The present invention as described above illustrates how the disappearing interface system operates after a period of inactivity. However, it should be noted that the disappearing function of the disappearing interface system can be manually controlled by the user by activating an input through the user interface 12. When the user activates the appropriate input through the user interface 12, all or a portion of the informational display area 14 will disappear.

While specific embodiments of the invention have been described and illustrated, it is to be understood that these embodiments are provided by way of example only and that the invention is not to be construed as being limited thereto but only by proper scope of the following claims.

What is claimed is:

1. A disappearing interface system including:

an interface having at least one touch sensitive area for information exchange between a user and the interface system, the interface including at least one light-emitting diode visible to the user when activated; and a control system, operatively connected to the interface, and configured to gradually change an intensity of the light emitted from the light-emitting diode in response to a condition at the interface in a nonlinear manner, wherein one or more of the touch sensitive areas appear blank to the user when inactive, and wherein one or more of the touch sensitive areas appear visible to the user when active.

2. A disappearing interface system as set forth in claim 1, wherein the control system includes a microprocessor that performs functions of a time-stepping algorithm and provides a pulse width modulated output signal.

3. A disappearing interface system as set forth in claim 2, wherein the intensity of the light is a function of the pulse width modulated signal frequency generated by the microprocessor.

4. A disappearing interface system as set forth in claim 1, wherein the interface system is part of a control system for an appliance.

5. A disappearing interface system as set forth in claim 4, wherein the appliance is a cooking range.

6. A disappearing interface system as set forth in claim 1, including a medium located between the light-emitting diode and the user, the medium permits viewing of the light-emitting diode when the light-emitting diode is activated and obscures viewing of the light-emitting diode when the light-emitting diode is not activated.

7. A disappearing interface system as set forth in claim 6, wherein the medium is black glass.

8. A disappearing interface system as set forth in claim 1, wherein the control system includes a circuit that provides a varying voltage to the light-emitting diode.

9. A disappearing interface system as set forth in claim 8, wherein the circuit includes a transistor that is operated to output a varying voltage.

10. A disappearing interface system as set forth in claim 8, wherein the circuit includes a transistor that is operated via a pulsed input to the transistor.

11. A disappearing interface system as set forth in claim 10, wherein the control system includes means for providing the pulsed input to the transistor.

12. A disappearing interface system as set forth in claim 11, wherein means for providing the pulsed input changes the frequency exponentially over time.

13. A disappearing interface system as set forth in claim 10, wherein the circuit includes a capacitor connected to an output of the transistor such that a voltage at the transistor output is averaged to an analog voltage.

14. A disappearing interface system as set forth in claim 13, wherein the circuit includes a second transistor that is operated to output a varying voltage, the analog voltage is used to control the second transistor.

15. A disappearing interface system as set forth in claim 14, wherein the second transistor is operatively connected to a supply voltage, application of the analog voltage to the second transistor is used to control the percent of the supply voltage that passes through the second transistor.

16. A disappearing interface system as set forth in claim 15, wherein the percent of the supply voltage that passes through the second transistor is provided to the light-emitting diode.

17. A disappearing interface system of claim 1, wherein the at least one touch sensitive area includes a plurality of touch pad buttons and the interface further includes an informational display area to display graphics.

18. A disappearing interface system of claim 17, wherein the control system further comprises a digitized exponential curve and a microprocessor based time-stepped algorithm to process data from the digitized exponential curve.

19. A disappearing interface system of claim 18, wherein the microprocessor generates a pulse width modulated output digital signal based on the data processed by the time-stepped algorithm, wherein the frequency of the pulse-width output signal is proportional to the data received from the time-stepped algorithm.

20. A disappearing interface system of claim 19, wherein the control system further comprises a digital to analog circuit to receive the pulse width modulated output signal, wherein the digital to analog circuit provides an output voltage to the at least one light-emitting diode that is proportional to the frequency of the pulse-width modulated output signal.

21. A disappearing interface system of claim 20, wherein the at least one light emitting diode further comprises an LED array, wherein the light intensity of the LED array is proportional to the output voltage of the digital to analog circuit.

22. A disappearing interface system of claim 21, wherein the LED array illuminates the graphics on the informational display.

23. A disappearing interface system of claim 22, wherein when the frequency of the pulse-width modulated signal increases at least a portion of the graphics on the informational display illuminate and when the frequency of the pulse-width modulated signal decreases at least a portion of the graphics on the informational display disappear.

24. A disappearing interface system of claim 1, wherein the control system includes a digital to analog converter and a means to provide a variable frequency digital signal as an input to the digital to analog converter.

* * * * *